US011312791B2

(12) United States Patent
Liu et al.

(10) Patent No.: US 11,312,791 B2
(45) Date of Patent: Apr. 26, 2022

(54) HYDROGENATION OF NITRILE RUBBER

(71) Applicant: ARLANXEO DEUTSCHLAND GMBH, Dormagen (DE)

(72) Inventors: Qingchun Liu, Huangpi District Shanghai (CN); Zhenli Wei, Pudong New District Shanghai (CN); Karola Schneiders, Bergisch Gladbach (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 0 days.

(21) Appl. No.: 17/262,034

(22) PCT Filed: Jul. 9, 2019

(86) PCT No.: PCT/EP2019/068382
§ 371 (c)(1),
(2) Date: Jan. 21, 2021

(87) PCT Pub. No.: WO2020/020630
PCT Pub. Date: Jan. 30, 2020

(65) Prior Publication Data
US 2021/0292442 A1    Sep. 23, 2021

(30) Foreign Application Priority Data
Jul. 23, 2018 (WO) ................ PCT/CN2018/096628

(51) Int. Cl.
*C08C 19/02* (2006.01)
(52) U.S. Cl.
CPC .................... *C08C 19/02* (2013.01)
(58) Field of Classification Search
CPC .................................................. C08C 19/02
See application file for complete search history.

(56) References Cited

U.S. PATENT DOCUMENTS

| | | | |
|---|---|---|---|
| 3,700,637 A | 10/1972 | Finch, Jr. | |
| 4,464,515 A | 8/1984 | Remel et al. | |
| 4,503,196 A | 3/1985 | Rempel et al. | |
| 4,581,417 A | 4/1986 | Buding et al. | |
| 4,631,315 A | 12/1986 | Buding et al. | |
| 4,746,707 A | 5/1988 | Fiedler et al. | |
| 4,795,788 A | 1/1989 | Himmler et al. | |
| 4,978,771 A | 12/1990 | Fiedler et al. | |
| 5,208,296 A * | 5/1993 | Rempel .................... | C08C 19/02 525/329.3 |
| 5,210,151 A | 5/1993 | Rempel et al. | |
| 5,258,467 A | 11/1993 | Rempel et al. | |
| 7,737,233 B2 * | 6/2010 | Obrecht .............. | B01J 31/2404 526/126 |
| 8,536,277 B2 | 9/2013 | Mueller et al. | |
| 10,000,584 B2 | 6/2018 | Liu et al. | |
| 2009/0069516 A1 | 3/2009 | Obrecht et al. | |
| 2010/0087600 A1 | 4/2010 | Mueller et al. | |
| 2010/0093944 A1 | 4/2010 | Mueller et al. | |
| 2013/0261269 A1 | 10/2013 | Mueller et al. | |
| 2015/0119530 A1 * | 4/2015 | Liu ........................ | C08L 15/005 525/329.3 |
| 2016/0122376 A1 * | 5/2016 | Wei ...................... | B01J 31/2273 525/338 |

FOREIGN PATENT DOCUMENTS

| | | |
|---|---|---|
| CA | 2 048 929 A1 | 2/1992 |
| CN | 101623657 A | 1/2010 |
| CN | 101624428 A | 1/2010 |
| CN | 104271607 A | 1/2015 |
| DE | 25 39 132 A1 | 3/1977 |
| DE | 34 33 392 A1 | 3/1986 |
| DE | 35 29 252 A1 | 2/1987 |
| DE | 35 40 918 A1 | 5/1987 |
| DE | 35 41 689 A1 | 5/1987 |
| EP | 1 558 491 A1 | 1/1980 |
| EP | 0 134 023 A1 | 3/1985 |
| EP | 0 298 386 A2 | 11/1989 |
| EP | 0 471 250 A1 | 2/1992 |
| EP | 0 588 096 A1 | 3/1994 |
| EP | 0 588 097 A1 | 3/1994 |
| EP | 0 588 098 A1 | 3/1994 |
| EP | 2 027 919 A2 | 2/2009 |
| EP | 2 072 532 A1 | 6/2009 |
| EP | 2 072 533 A1 | 6/2009 |
| WO | 03 011455 A1 | 2/2003 |
| WO | 2006 066394 A1 | 6/2006 |
| WO | 2013 160470 A1 | 10/2013 |

OTHER PUBLICATIONS

Arduengo et al., "A Stable Crystalline Carbene"; American Chemical Society 1991, 113, pp. 361-363.

Beach et al., "Improved Syntheses of Versatile Ruthenium Hydridocarbonyl Catalysts Containing Electron-Rich Ancillary Ligands"; Adv. Synth. Catal. 2008, 350, pp. 7773-7777.

Beach, et al., "Carbonyl-Amplified Catalyst Performance: Balancing Stability against Activity for Five-Coordiante Ruthenium Hydride and Hydridocarbonyl Catalysts"; Organometalics 2009, 28, pp. 441-447.

Dharmasena, et al., "N-Heterocyclic Carbenes as Activating Ligands for Hydrogenation and Isomerization of Unactivated Olefins"; Organometallics, 2005, 24, pp. 1056-1058.

Dinger et al., "Degradation of the Second-Generation Grubbs Metathesis Catalyst with Primary Alcohols and Oxygen—Isomerization and Hydrogenation Activities of Monocarbonyl Complexes"; Eur. J. Inorg. Chem., 2003, pp. 2827-2833.

Hintermann, Lukas; "Expedient syntheses of the N-heterocycic carbene precursor imidazolium salts IPr.HCL, IMes.HCL and IXy.HCl"; Beilstein Journal of Organic Chemistry, 2007, 3 No. 22.

(Continued)

*Primary Examiner* — Robert C Boyle
(74) *Attorney, Agent, or Firm* — Norris McLaughlin, P.A.

(57) ABSTRACT

This invention relates to a novel process for selectively and efficiently hydrogenating nitrile rubber in the presence of specific complex catalysts system comprising an NHC-ligand comprising Ru-complex catalyst and a specific hydrogenation enhancer.

15 Claims, No Drawings

(56) References Cited

OTHER PUBLICATIONS

James et al., "Tricyclohexylophosphine Complexes of Ruthenium, Rhodium, and Iridium and Their Reactivity Toward Gas Molecules"; Advances in Chemistry, 196 (1983).
Kuhn et al., "A Facile Preparation of Imidazolinium Chlorides"; Org. Lett. May 15, 2008, 10 (10); pp. 2075-2077.
Lee et al., "Catalytic Hydrogenation of Alkenes by the Ruthenium—Carbene Complex HRu(C))(Cl(PCy3)(IMes) (IMes=Bis(1,3-(2,4,6-trimethylphenyl)imidazol-2-ylidene)"; Organometallics, 2001, 20, pp. 794-797.
Martin et al., "A detailed study of the hydrogenation of nitrile-butadiene rubber and other substrates catalyzed by RU (II) complexes"; Journal of Molecular Catalysis A: Chemical 126 (1997), pp. 115-131.
Strassberger et al., "A facile route to ruthenium-carbene complexes and their applicaiton in furfural hydrogenation"; Appl. Organometal. Chem., 2010, 24, pp. 142-146.

\* cited by examiner

HYDROGENATION OF NITRILE RUBBER

This application is a 371 of PCT/EP2019/068382, filed Jul. 9, 2019, which claims foreign priority benefit under 35 U.S.C. § 119 of International Application No. PCT/CN2018/096628, filed Jul. 23, 2018, the disclosures of which are incorporated herein by reference.

FIELD OF THE INVENTION

This invention relates to a water-free process for selectively and efficiently hydrogenating nitrile rubber in the presence of specific catalysts system comprising a Ru-NHC-catalyst and a specific hydrogenation enhancer.

BACKGROUND OF THE INVENTION

For commercial purposes the hydrogenation of NBR is performed in organic solvents by using either a heterogeneous or a homogeneous transition metal catalyst often based on rhodium or palladium. Such processes suffer from drawbacks such as high prices for the catalyst metals and the cost involved in catalyst metal removal/recycle. This has led to research and development of alternative catalysts based on cheaper noble metals, such as ruthenium.

Ru-based complexes of the type Ru(X)Cl(CO)L$_2$ with X meaning H or CH=CHPh are good catalysts for polymer hydrogenation in solution. RuHCl(CO)L$_2$ (L being a bulky phosphine) catalyst systems lead to quantitative hydrogenation of NBR as disclosed in Journal of Molecular Catalysis A: Chemical, 1997, 126(2-3), 115-131. During such hydrogenation it is not necessary to add a free phosphine ligand to maintain the catalyst activity. However, GPC results indicate that these catalysts cause a certain degree of cross-linking during hydrogenation and the HNBR obtained is prone to gel formation.

In EP-A-0 298 386 6-fold coordinated Ru-based complexes Ru(CO)HCl(Z)$_3$ (Z being a phosphine ligand such as PPh$_3$) without an NHC ligand (N-heterocyclic carbene) are used for the hydrogenation of nitrile rubber but various additives or ligands such as phosphines or carboxylic acids, e.g. benzoic acid or acetic acid, have to be added to avoid gel formation.

U.S. Pat. No. 5,208,296 discloses catalytic hydrogenation of nitrile rubber latex with Ru-catalysts and organic additives. Mono- and dicarboxylic acids are listed as possible additives, e.g. citric acid and ascorbic acid. Catalysts are also Ru-based but without NHC ligand. However, results from hydrogenation of NBR in latex form are not to be transferred directly to solution conditions.

Likewise, EP-A-0 588 098 and EP-A-0 588 096 use inorganic additives such as salts and acids like sulfuric and phosphoric acid for the same purpose together with traces of water which must be considered as being severely corrosive which in turn demands the use of expensive high-grade steel for all the hydrogenation facility. The amounts of catalyst needed vary from 923 to 1013 ppm based on Ru metal relative to rubber in EP-A-0 588 096 and approximately 100 ppm Ru metal in EP-A-0 588 098.

While some applications of HNBR may not be sensitive to the presence of additives such as for industrial applications there are also applications subject to government health and safety regulations which in general tend to favor cleaner polymers or polymers containing less contaminants or additives. For practical reasons it is very desirable to run the same catalyst system in a plant for all designated products and a simpler catalyst system without additives may allow to produce products both for industrial and for regulated applications.

Additionally higher catalyst efficiencies are also desirable as precious metals such as Palladium, Rhodium, Iridium, Platinum and Ruthenium are expensive.

Various Ruthenium catalyst systems have been proposed which can be used for the hydrogenation of nitrile rubber.

In EP-A-0 588 097 the catalysts RuCl$_2$(PPh$_3$)$_2$ and RuHCl(CO)(PCy$_3$)$_2$ are used for the nitrile rubber hydrogenation in MEK solution. However, the obtained products are gelled unless a relatively high amount (ca. 5 phr) of ascorbic acid is added. In further examples the addition of various organic acids or dibasic acids is described. The amount of catalyst used is reported to be from 229 to 1054 ppm Ru metal per 100 parts by weight rubber.

Ruthenium complexes of the formula RuHCl(CO)(IMes)(PCy$_3$) have been prepared for the first time and tested for 1-hexene hydrogenation by Nolan et al (Organometallics 2001, 20, 794) and the RuHCl(CO)(IMes)(PCy$_3$) catalyst was found to be less active than the simpler RuHCl(CO)(PCy$_3$)$_2$ wherein Cy means cyclohexyl. This reference, however, does not provide any disclosure, hint or teaching whether such complexes may be also used for hydrogenating polymers, in particular nitrile rubbers and if the use of RuHCl(CO)(IMes)(PCy$_3$) as catalyst compared to the use of RuHCl(CO)(PCy$_3$)$_2$ as catalyst has any impact on or benefit for the physical properties of any hydrogenated nitrile rubbers obtained thereby.

Fogg et al. (Organometallics 2005, 24, 1056-1058) prepared the complexes RuHCl(CO)(PPh$_3$)NHC with NHC=IMes or SIMes by reaction of the precursor RuHCl(CO)(PPh$_3$)$_3$ with the respective NHC-ligand.

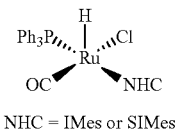

NHC = IMes or SIMes

Hydrogenation trials with cyclooctene revealed a good hydrogenation efficiency for this catalyst with NHC=IMes (IMes being N,N'-bis(mesityl)imidazol-2-ylidene) but as a side reaction also ca. 20% of a ROMP-polymer were found which indicates that this catalyst or a derived active species have metathesis activity. This in turn implies that a hydrogenation of diene-polymers would be accompanied by molecular weight degradation as this process proceeds through metathesis steps. While this is beneficial for the purpose of generating lower molecular weight rubbers it is a serious drawback for a controlled preparation of hydrogenated polymers without molecular weight reduction which are necessary for many high end rubber parts. Contrary thereto no ROMP-polymerization was observed with cyclododecene as substrate to be hydrogenated. This different behavior depending on the substrate does not allow a person skilled in the art to draw any conclusion or make any prediction about those catalysts' behavior.

Fogg et al (Organometallics 2009, 28, 441-447) tested the hydrogenation performance of catalysts with the formulae RuHCl(H$_2$)(PCy$_3$)(L) and RuHCl(CO)(PCy$_3$)(L) wherein L=P(Cy)$_3$ with Cy being cyclohexyl or L=IMes with IMes being N,N'-bis(mesityl)imidazol-2-ylidene for various substrates such as styrene and allyl-benzene as well as for polymers obtained by ROMP of norbornenes and derivatives thereof. Comparing the ruthenium complexes with and without an NHC-ligand one cannot find a clear advantage for those ones with an NHC-ligand. The trials were conducted under moderate conditions such as room temperature and up to 55° C. with relatively high catalyst loadings.

The hydrogenation of polymeric substrates is much more demanding compared to the hydrogenation of small molecules and results in substantially lowered turnover frequencies as well as conversions despite high/higher catalyst loadings and in the necessity of increased reaction times.

The use of Ru-based catalysts (with and without NHC-ligands) with additives is in principle known i.e. from the following documents:

U.S. Pat. No. 5,210,151 discloses a process of NBR-latex hydrogenation with Ru-catalysts (without NHC-ligand) and inorganic additives, especially iron sulfate, ammonium sulfate and iron ammonium sulfate but also mineral acids as HCl. Catalysts are also Ru-based but without NHC ligand. But as reaction conditions in latex hydrogenation differ tremendously from those in solution, this application does not teach the effects of said additives to a solution hydrogenation of NBR.

U.S. Pat. No. 5,258,467 discloses solution hydrogenation with Ru-catalysts and organic additives, especially carboxylic acids, from which chloroacetic acid, oxalic acid, adipic acid and citric acid are preferred. Catalysts are also Ru-based phosphine complexes but without NHC ligand. The supplementary addition of water to the reaction system is explicitly mentioned. In this patent, additional water is required in hydrogenation. As mentioned before, one cannot anticipate effects of additives on such different kind of Ru-complexes.

Organometallics, 2001, 20, 794 discloses the use of [Ru(CO)HCl)IMes)(PCy$_3$)] as hydrogenation catalyst for single molecules such as hexene, allyl benzene and cyclooctene but not for polymers such as nitrile rubbers. Via the addition of tetrafluoroboric acid diethyl ether (HBF$_4$*OEt$_2$) the active catalyst is formed. However, this publication does not indicate the activity of this catalyst system for polymers.

WO-A-13/160470 discloses Ru-based complexes with NHC ligands as hydrogenation catalysts for nitrile rubbers. As advantages are listed a relatively simple ligand sphere compared to other Ru-NHC-catalysts, a high hydrogenation efficiency, a lack of metathesis activity, and suppression of viscosity increase. No additives are mentioned in the patent application.

Summarizing the above it becomes clear that
(1) up to now, Ru-based hydrogenation catalysts which are active for the selective hydrogenation of nitrile rubbers are known and Rh- and Pd-based catalysts are already used in industrial hydrogenation processes; however, Ru-based hydrogenation catalysts are still facing improvable catalytic activity and the gel formation problem when used for NBR hydrogenation.
(2) the use of various additives is known for NBR-latex hydrogenation reactions in aqueous medium. The used additives are of various kinds including alkaline and acidic additives as well as alkaline earth and heavy metals; however, a clear teaching is missing which kind of additives improve also NBR hydrogenation reaction of Ru-NHC-catalysts in water-free solvent, as not any additive improves the hydrogenation of any hydrogenation catalyst; and
(3) the activity from Ru-based catalyst comprising NHC-ligands and from Ru-based catalysts without NHC-ligands is not identical.
(4) the teaching of activity enhancing additives in a latex hydrogenation reaction is not transferable to a water-free solvent hydrogenation in organic solvents.

In view of the above mentioned obstacles there was still a need for an improved hydrogenation process of nitrile rubber with Ru-NHC-catalysts.

Ideally, such process should proceed in a controlled manner, i.e. without a simultaneous molecular weight degradation due to a metathesis reaction.

Such process should be efficient in that a catalyst already provides the required turn over frequency. In other words, it was an object to obtain a (fully) hydrogenated nitrile rubber with the same amount of Ru-based catalyst but in shorter reaction times. According to prior art a catalyst and additive removal or recycle step is often required after the hydrogenation to remove undue high residual catalyst contents. Hence the novel process to be provided should preferably represent a leave-in-catalyst technology.

Especially, one object of the invention was to find a process to reduce the reaction time of hydrogenation reactions of nitrile rubbers using Ru-NHC-catalysts disclosed in WO-A-13/160470.

As it was known from the prior art that Ru-NHC-catalysts are in general deactivated by water, it was a further object to provide a water-free process for hydrogenation.

Such process should further provide access to hydrogenated nitrile rubber having in particular medium to high molecular weight and with a range of Mooney viscosities (ML1+4@100° C.) of from 50 to 130 Mooney units which leads to improved HNBR compositions. Furthermore, the desired process shall have positive effect on the Mooney increase and the gel content of the HNBR and thus on the processability.

A further object was to provide a Ru-NHC-catalyst system which can be used for the hydrogenation of nitrile rubbers.

SUMMARY OF THE INVENTION

The above objects have been surprisingly solved by contacting a nitrile rubber with hydrogen in the presence of a catalyst system comprising the components (A) and (B) wherein component (A) is a Ru-NHC-catalyst of the subsequently following general formula (I),

wherein
X$^1$ is an anionic ligand, and
L$^1$ and L$^2$ are identical or different ligands, wherein at least one of L$^1$ and L$^2$ represents a N-heterocyclic carbene ligand, and
(B) is a specific additive (also called "hydrogenation enhancer") selected from the group consisting of
    weak organic acids with a pKs (at 25° C.) of larger than 3, such as acetic acid, citric acid or ascorbic acid,
    earth alkaline metal salts such as MgCl$_2$ or CaCl$_2$,
    tetrafluoroboric acid diethyl ether (HBF$_4$*OEt$_2$) and
    trichloro(phenyl)silane.

Preferably, the hydrogenation enhancer is selected from the group consisting of CaCl$_2$, citric acid, ascorbic acid, tetrafluoroboric acid diethyl ether (HBF$_4$*OEt$_2$) and trichloro(phenyl)silane, or mixtures thereof, thereby selectively and efficiently hydrogenating the C=C double bonds in the polymer backbone of the nitrile rubber. The activity of the catalyst can be significantly increased in a way that the reaction times can be reduced without disadvantages concerning gel formation or higher Mooney ageing, that is Mooney viscosity increase during ageing. This is of utmost importance as a leave-in-catalyst technology is pursued. Hydrogenation enhancers are used in small amounts of typically less than 10 phr, preferably less than 1 phr based on the nitrile rubber. It is important to highlight that no additional water is added.

It is surprising that the water-soluble hydrogenation enhancers are active in a water-free organic solvent. It was a clear object to be water-free, as the catalyst is water-instable.

The present invention thus relates to a process for preparing partially or fully hydrogenated nitrile rubbers characterized in that a nitrile rubber is subjected to a hydrogenation in solution in the presence of a catalyst system comprising the components
(A) at least one Ru-NHC-catalyst having the general formula (I)

$$Ru(CO)(H)(X^1)(L^1)(L^2) \qquad (I)$$

wherein
$X^1$ is an anionic ligand, and
$L^1$ and $L^2$ are identical or different ligands, wherein at least one of $L^1$ and $L^2$ represents a N-heterocyclic carbene ligand, and
(B) a specific additive or hydrogenation enhancer (B) selected from the group consisting of weak organic acids with a pKs (at 25° C.) of larger than 3, such as acetic acid, citric acid or ascorbic acid, earth alkaline metal salts such as $MgCl_2$ or $CaCl_2$, tetrafluoroboric acid diethyl ether ($HBF_4{*}OEt_2$) and trichloro(phenyl)silane or mixtures thereof.

DETAILED DESCRIPTION OF THE INVENTION

Advantageously the use of the catalyst system comprising the components (A) and (B) allows performing the hydrogenation reaction of the nitrile rubber. The catalyst system comprising component (A) and (B) features a high activity and selectivity in said hydrogenation of nitrile rubber in solution, i.e. a high degree of hydrogenation may be achieved in short reaction times, preferably with low catalyst concentrations. Accordingly, there is no need to remove or recycle the catalyst system comprising the Ru-NHC-catalyst (A) and the hydrogenation enhancer (B) after the hydrogenation. Furthermore, HNBR prepared in the presence of the inventive catalyst system comprising (A) and (B) have certain amounts of Ru metal and Ca ions which beneficially impedes the gel formation and the Mooney increase after aging.

The term "substituted" used for the purposes of the present patent application means that a hydrogen atom on an indicated radical, molecule or complex has been replaced by one of the groups indicated in each case, with the proviso that the valency of the atom indicated is not exceeded and the substitution leads to a stable compound.

The term "water-free" used for the purposes of the present patent application means that less than 1 wt.-% water is present in the reaction system. The residual water of less than 1 wt.-% might be of any source, including i.e. moisture in the NBR and water impurities in the organic solvent.

For the purposes of the present patent application and invention, all the definitions of moieties, parameters or explanations given above or below in general terms or in preferred ranges can be combined with one another in any way and shall be considered as disclosed this way, i.e. including combinations of the respective ranges and preferred ranges.

Definition of the Catalyst System:

The catalyst system to be used according to the invention comprises as component (A) a Ru-NHC-catalyst which has the general formula (I), $$Ru(CO)(H)(X^1)(L^1)(L^2) \qquad (I)$$

wherein
$X^1$ is an anionic ligand, and
$L^1$ and $L^2$ are identical or different ligands, wherein at least one of $L^1$ and $L^2$ represents a N-heterocyclic carbene ligand.

The catalyst according to general formula (I) may have the following geometry

i.e. a tetragonal pyramidal geometry. While a number of catalysts do have this tetragonal pyramidal geometry, deviations from that geometry are also possible due to variations of the ligand sphere which shall also be within the scope of this invention.

Definition of $L^1$ and $L^2$:

In the general formula (I), $L^1$ and $L^2$ are identical or different ligands at least one of which represents a N-heterocyclic carbene ligand.

In one embodiment
$L^1$ represents a ligand selected from the group consisting of a phosphine, sulfonated phosphine, phosphate, phosphinite, phosphonite, arsine, stibine, ether, amine, amide, sulfonate, sulfoxide, carboxyl, nitrosyl, pyridine, thioether, nitrile and isocyanide and
$L^2$ represents a N-heterocyclic carbene ligand.

In an alternative embodiment both ligands $L^1$ and $L^2$ represent an identical or different N-heterocyclic carbene ligand.

If $L^1$ represents a phosphine, sulfonated phosphine, phosphate, phosphinite, phosphonite, arsine, stibine, ether, amine, amide, sulfonate, sulfoxide, carboxyl, nitrosyl, pyridine-based ligands, or thioether the following ligands can be typically used:

The term "phosphinite" includes, for example, phenyl diphenylphosphinite, cyclohexyl dicyclohexylphosphinite, isopropyl diisopropylphosphinite and methyl diphenylphosphinite.

The term "phosphite" includes, for example, triphenyl phosphite, tricyclohexyl phosphite, tri-tert-butyl phosphite, triisopropyl phosphite and methyl diphenyl phosphite.

The term "stibine" includes, for example, triphenylstibine, tricyclohexylstibine and trimethylstibine.

The term "sulfonate" includes, for example, trifluoromethanesulfonate, tosylate and mesylate.

The term "sulfoxide" includes, for example, $(CH_3)_2S(=O)$ and $(C_6H_5)_2S=O$.

The term "thioether" includes, for example, $CH_3SCH_3$, $C_6H_5SCH_3$, $CH_3OCH_2CH_2SCH_3$ and tetrahydrothiophene.

For the purposes of the present application, the term "pyridine-based ligands" is used as a collective term for all pyridine-based ligands or derivatives thereof as mentioned, for example, in WO-A-03/011455. The term "pyridine-based ligands" hence includes pyridine itself, picolines (like α-, β- and γ-picoline), lutidines (like 2,3-, 2,4-, 2,5-, 2,6-, 3,4- and 3,5-lutidine), collidine (namely 2,4,6-trimethylpyridine), trifluoromethylpyridine, phenylpyridine, 4-(dimethylamino)-pyridine, chloropyridines, bromopyridines, nitropyridines, quinoline, pyrimidine, pyrrole, imidazole and phenylimidazole.

If $L^1$ in general formula (I) represents a phosphine as electron-donating ligand such phosphine preferably has the general formula (IIf) wherein

(IIf)

$R^1$, $R^2$ and $R^3$ are identical or different, even more preferably identical, and can represent $C_1$-$C_{20}$ alkyl, preferably methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, or neophenyl, $C_3$-$C_8$-cycloalkyl, preferably cyclopropyl, cyclobutyl, cyclopentyl, cyclohexyl, cycloheptyl or cyclooctyl, alkoxy, substituted or unsubstituted $C_6$-$C_{20}$ aryl, preferably phenyl, biphenyl, naphthyl, phenanthrenyl, anthracenyl, tolyl, 2,6-dimethylphenyl, or trifluoromethyl, $C_6$-$C_{20}$ aryloxy, $C_2$-$C_{20}$ heteroaryl with at least one heteroatom in the cycle, a $C_2$-$C_{20}$ heterocyclyl with at least one heteroatom in the cycle or halogen, preferably fluoro;

If $L^1$ represents a phosphine of general formula (IIf) as electron-donating ligand in general formula (I) such phosphine preferably represents $PPh_3$, $P(p\text{-}Tol)_3$, $P(o\text{-}Tol)_3$, $PPh(CH_3)_2$, $P(CF_3)_3$, $P(p\text{-}FC_6H_4)_3$, $P(p\text{-}CF_3C_6H_4)_3$, $P(C_6H_4\text{—}SO_3Na)_3$, $P(CH_2C_6H_4\text{—}SO_3Na)_3$, $P(\text{isopropyl})_3$, $P(CHCH_3(CH_2CH_3))_3$, $P(\text{cyclopentyl})_3$, $P(\text{cyclohexyl})_3$, $P(\text{neopentyl})_3$ or $P(\text{neophenyl})_3$, wherein Ph means phenyl and Tol means tolyl.

The N-heterocyclic carbene ligand represents a cyclic carbene type ligand with at least one nitrogen as hetero atom being present in the ring. The ring can exhibit different substitution patterns on the ring atoms. Preferably this substitution pattern provides a certain degree of steric crowing.

In the context of this invention the N-heterocyclic carbene ligand(s) (hereinafter referred to as "NHC-ligand(s)") is/are preferably based on imidazoline or imidazolidine moieties.

The NHC-ligand typically has a structure corresponding to the general formulae (IIa) to (IIe)

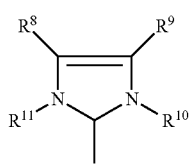

(IIa)

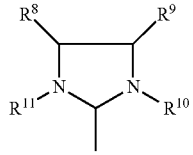

(IIb)

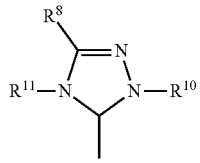

(IIc)

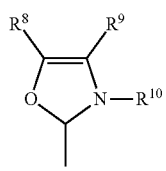

(IId)

(IIe)

wherein
$R^8$, $R^9$, $R^{10}$ and $R^{11}$ are identical or different and represent hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_7$-$C_{25}$-alkaryl, $C_2$-$C_{20}$ heteroaryl, $C_2$-$C_{20}$ heterocyclyl, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, —Si(R)$_3$, —O—Si(R)$_3$, —O—C(=O)R, C(=O)R, —C(=O)N(R)$_2$, —NR—C(=O)—N(R)$_2$, —SO$_2$N(R)$_2$, —S(=O)R, —S(=O)$_2$R, —O—S(=O)$_2$R, halogen, nitro or cyano; wherein in all above occurrences relating to the meanings of $R^{8'}$ $R^9$, $R_{10}$ and $R^{11}$ the group R is identical or different and represents hydrogen, alkyl, cycloalkyl, alkenyl, alkynyl, aryl or heteroaryl.

In these formulae (IIa) to (IIe) the carbon atom bonding to the Ruthenium metal center is formally a carbene carbon.

If appropriate, one or more of $R_8$, $R^9$, $R^{10}$, and $R^{11}$ can independently of one another, be substituted by one or more substituents, preferably straight-chain or branched $C_1$-$C_{10}$-alkyl, $C_3$-$C_8$-cycloalkyl, $C_1$-$C_{10}$-alkoxy, $C_6$-$C_{24}$-aryl, $C_2$-$C_{20}$ heteroaryl, $C_2$-$C_{20}$ heterocyclic, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, wherein the abovementioned substituents, to the extent chemically possible, may in turn be substituted by one or more substituents, preferably selected from the group consisting of halogen, in particular chlorine or bromine, $C_1$-$C_5$-alkyl, $C_1$-$C_5$-alkoxy and phenyl.

Merely in the interest of clarity, it may be added that the structures of the NHC-ligand depicted in the general formulae (IIa) and (IIb) in the present patent application are equivalent to the structures (IIa-(i)) and (IIb-(i)) which are frequently also found in the literature for such NHC-ligands, respectively, and emphasize the carbene character of the NHC-ligand. This applies analogously to the further structures (IIc) to (IIe) as well as the associated preferred structures (IIIa)-(IIIu) depicted below.

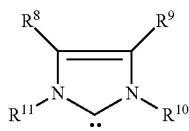
(IIa-(i))

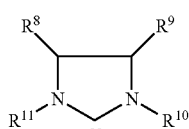
(IIb-(i))

In preferred NHC-ligand(s) in the catalysts of the general formula (I)

$R^8$ and $R^9$ are identical or different and represent hydrogen, $C_6$-$C_{24}$-aryl, more preferably phenyl, straight-chain or branched $C_1$-$C_{10}$-alkyl, more preferably methyl, ethyl, n-propyl, i-propyl, n-butyl, sec-butyl, i-butyl or tert.-butyl or form a cycloalkyl or aryl structure together with the carbon atoms to which they are bound.

The preferred and more preferred meanings of $R^8$ and $R^9$ may be substituted by one or more further substituents selected from the group consisting of straight-chain or branched $C_1$-$C_{10}$-alkyl or $C_1$-$C_{10}$-alkoxy, $C_3$-$C_8$-cycloalkyl, $C_6$-$C_{24}$-aryl, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, wherein all these substituents may in turn be substituted by one or more substituents, preferably selected from the group consisting of halogen, in particular chlorine or bromine, $C_1$-$C_5$-alkyl, $C_1$-$C_5$-alkoxy and phenyl.

In further preferred NHC-ligand(s) in the catalysts of the general formula (I)

$R^{10}$ and $R^{11}$ are identical or different and preferably represent straight-chain or branched $C_1$-$C_{10}$-alkyl, more preferably i-propyl or neopentyl, cycloalkyl, more preferably adamantyl, substituted or unsubstituted $C_6$-$C_{24}$-aryl, more preferably phenyl, 2,6-diisopropylphenyl, 2,6-dimethylphenyl, or 2,4,6-trimethylphenyl, $C_1$-$C_{10}$-alkylsulfonate, or $C_6$-$C_{10}$-arylsulfonate.

These preferred meanings of $R^{10}$ and $R^{11}$ may be substituted by one or more further substituents selected from the group consisting of straight-chain or branched $C_1$-$C_{10}$-alkyl or $C_1$-$C_{10}$-alkoxy, $C_3$-$C_8$-cycloalkyl, $C_6$-$C_{24}$-aryl, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, wherein all these substituents may in turn be substituted by one or more substituents, preferably selected from the group consisting of halogen, in particular chlorine or bromine, $C_1$-$C_5$-alkyl, $C_1$-$C_5$-alkoxy and phenyl.

In preferred NHC-ligand(s) in the catalysts of the general formula (I)

$R^8$ and $R^9$ are identical or different and represent hydrogen, $C_6$-$C_{24}$-aryl, more preferably phenyl, straight-chain or branched $C_1$-$C_{10}$-alkyl, more preferably methyl, ethyl, n-propyl, i-propyl, n-butyl, sec-butyl, and i-butyl, or form a cycloalkyl or aryl structure together with the carbon atoms to which they are bound, and $R^{10}$ and $R^{11}$ are identical or different and preferably represent straight-chain or branched $C_1$-$C_{10}$-alkyl, more preferably i-propyl or neopentyl, $C_3$-$C_{10}$-cycloalkyl, more preferably adamantyl, substituted or unsubstituted $C_6$-$C_{24}$-aryl, more preferably phenyl, 2,6-diisopropylphenyl, 2,6-dimethylphenyl, or 2,4,6-trimethylphenyl, $C_1$-$C_{10}$-alkylsulfonate, or $C_6$-$C_{10}$-arylsulfonate.

Particularly preferred NHC-ligands have the following structures (IIIa) to (IIIu), where "Ph" means in each case phenyl, "Bu" means in each case butyl, i.e. either n-butyl, sec.-butyl, iso-butyl or tert.-butyl, "Mes" represents in each case 2,4,6-trimethylphenyl, "Dipp" means in all cases 2,6-diisopropylphenyl and "Dimp" means in each case 2,6-dimethylphenyl.

(IIIa)

(IIIb)

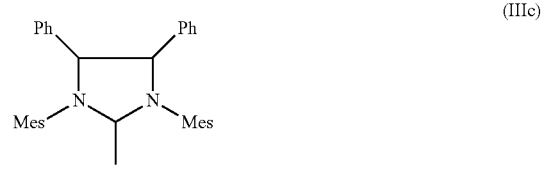
(IIIc)

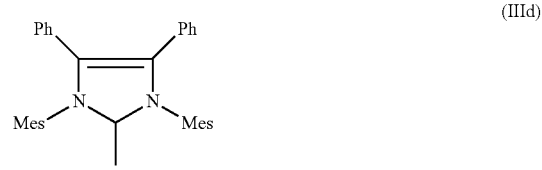
(IIId)

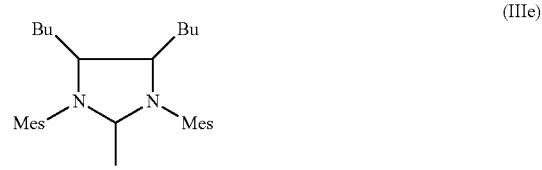
(IIIe)

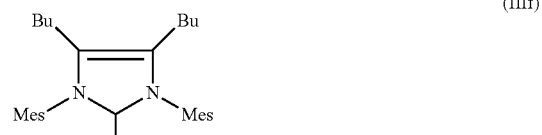
(IIIf)

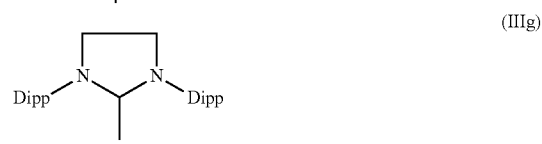
(IIIg)

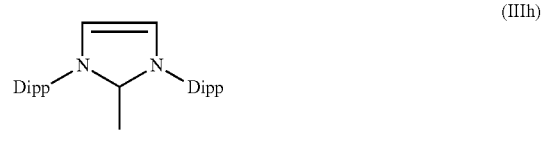
(IIIh)

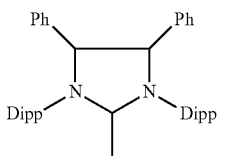
(IIIj)

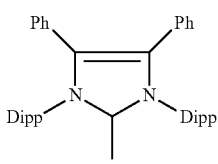
(IIIk)

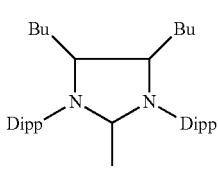
(IIIm)

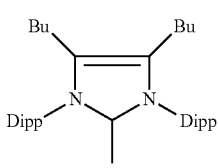
(IIIn)

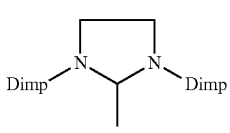
(IIIp)

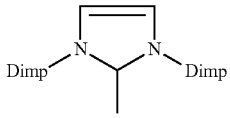
(IIIq)

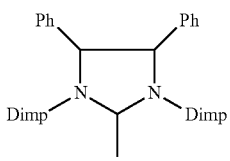
(IIIr)

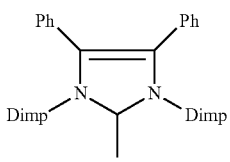
(IIIs)

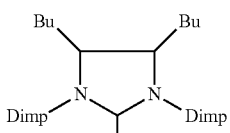
(IIIt)

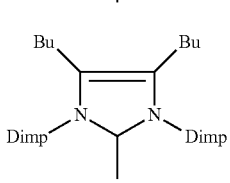
(IIIu)

Where the NHC-ligand contains not only an "N" (nitrogen), but also an "O" (oxygen) in the ring it is preferred that the substitution pattern of $R^8$, $R^9$, $R^{10}$ and/or $R^{11}$ provides a certain steric crowding.

Definition of $X^1$

In the catalysts of the general formula (I), $X^1$ preferably represents an anionic ligand.

In one embodiment of the catalysts of general formula (I), $X^1$ represents hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$C_{20}$-alkylthiol, $C_6$-$C_{24}$-arylthiol, $C_1$-$C_{20}$-alkylsulfonyl or $C_1$-$C_{20}$-alkylsulfinyl.

The abovementioned moieties listed as meanings for $X^1$ can also be substituted by one or more further substituents, for example by halogen, preferably fluorine, $C_1$-$C_{10}$-alkyl, $C_1$-$C_{10}$-alkoxy or $C_6$-$C_{24}$-aryl, where these groups, too, may in turn also be substituted by one or more substituents selected from the group consisting of halogen, preferably fluorine, $C_1$-$C_5$-alkyl, $C_1$-$C_5$-alkoxy and phenyl.

In a preferred embodiment, $X^1$ is halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{14}$-arylthiol, $C_6$-$C_{14}$-aryl or $C_1$-$C_5$-alkylsulfonate.

In a particularly preferred embodiment, $X^1$ represents chlorine, $CF_3COO$, $CH_3COO$, $CFH_2COO$, $(CH_3)_3CO$, $(CF_3)_2(CH_3)CO$, $(CF_3)(CH_3)_2CO$, phenoxy, methoxy, ethoxy, tosylate (p-$CH_3$—$C_6H_4$—$SO_3$), mesylate ($CH_3SO_3$) or trifluoromethanesulfonate ($CF_3SO_3$).

More preferred catalysts according to general formula (I) are the catalysts of formulae (I-a)-(I-d)

(I-a)

(I-b)

(I-c)

(I-d)

wherein $L^2$ represents an electron-donating ligand of the general formulae (IIa) or (IIb)

(IIa)

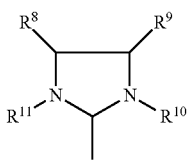

(IIb)

wherein
R⁸ and R⁹ are identical or different and represent hydrogen, C₆-C₂₄-aryl, more preferably phenyl, straight-chain or branched C₁-C₁₀-alkyl, more preferably methyl, ethyl, n-propyl, i-propyl, n-butyl, sec-butyl, and i-butyl, or form a cycloalkyl or aryl structure together with the carbon atoms to which they are bound, and
R¹⁰ and R¹¹ are identical or different and preferably represent straight-chain or branched C₁-C₁₀-alkyl, more preferably i-propyl or neopentyl, C₃-C₁₀-cycloalkyl, more preferably adamantyl, substituted or unsubstituted C₆-C₂₄-aryl, more preferably phenyl, 2,6-diisopropylphenyl, 2,6-dimethylphenyl, or 2,4,6-trimethylphenyl, C₁-C₁₀-alkylsulfonate, or C₆-C₁₀-arylsulfonate or
wherein L² preferably represents an electron-donating ligand of the general formulae (IIIa) to (IIIu) as depicted above.

Even more preferred catalysts according to general formula (I) are the catalysts of formulae (I-a(1)), (I-b(1)), (I-c(1)) and (I-d(1))

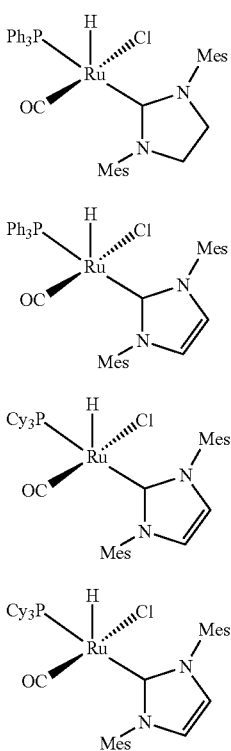

Catalysts on Support Materials:

In a further alternative embodiment all catalysts according to general formula (I) can be used in immobilized form. The immobilization favourably occurs via a chemical bond of the catalyst to the surface of a support material. Suited are e.g. catalysts having the general formulae (support-Ie) and (support-If) as depicted below, wherein L¹, L² and X¹ may have all general, preferred, more preferred, particularly preferred and most preferred meanings listed above in this application for general formula (I) and wherein "supp" stands for the support material. Preferably the support material represents a macromolecular material, or an inorganic material such as e.g. silica gel. As macromolecular material synthetic polymers or resins may be used, with polyethylene glycol, polystyrenes or cross-linked polystyrenes (e.g. poly(styrene-divinylbenzene) copolymers (PS-DVB)) being even more preferred. Such support material comprises functional groups on its surface which are able to form covalent bonds to one of the ligands L¹ or L².

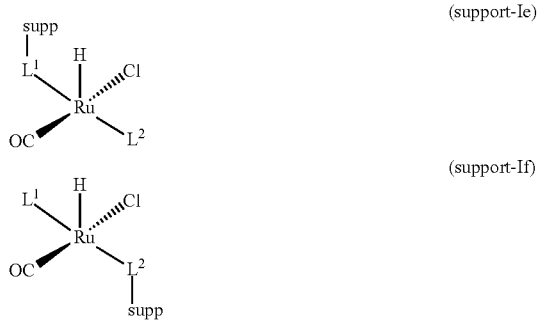

In the immobilized catalysts of general formulae (support-Ie) or (support-If) "supp" stands more preferably for a polymeric support, a resin, polyethyleneglycole, or silica gels having one or more functional groups "X²" on their surface which are able to form a covalent bond to one of the ligands as shown in the above formulae.

Suitable functional groups "X²" on the surface are hydroxyl, amino, thiol, carboxyl, C₁-C₂₀ alkoxy, C₁-C₂₀ alkylthio, —Si(R)₃, —O—Si(R)₃, C₆-C₁₄ aryloxy, C₂-C₁₄ heterocyclic, —C(=O)R, —C(=O)OR, —C(=O)N(R)₂, —SO₂N(R)₂, —S(=O)₂R, or —S(=O)R wherein in all above occurrences of R in X³ is identical or different and shall mean H, C₁-C₆-alkyl, C₅-C₆-cycloalkyl, C₂-C₆-alkenyl, C₂-C₆-alkynyl, phenyl, imidazolyl, triazolyl, or pyridinyl moieties.

Polystyrene or cross-linked polystyrene is the preferred support material, even more preferably with hydroxyl groups on the surface to allow an easy coupling to the catalyst.

Synthesis of the Catalysts According to General Formula (I):
Synthesis of NHC-Ligands:

For the synthesis of the NHC-ligands several procedures from the literature can be used which have been optimized already over time.

Hintermann (Beilstein Journal of Organic Chemistry 2007, 3, No. 22) gives synthetic procedures for 3 different imidazolium salts based on cheap basic chemicals. These salts can be easily converted into respective free carbenes by the action of strong bases. Especially the substitution pattern related to the groups attached to the imidazol-nitrogen atoms can be readily modified be employing the suitable amine. Considering the large array of aliphatic and even more aromatic amines available nowadays those skilled in the art of organic synthesis will appreciate the relative simplicity to obtain optimized catalyst compositions.

The synthesis of imidazoline-based NHC-carbenes also has been optimized recently by work of Kuhn and Grubbs (Org Lett. 2008 May 15; 10(10): 2075-2077). They propose a reaction sequence starting with the easy preparation of a large array of formamidines and the ring closure in a one-step reaction to yield imidazolinium salts. It is noteworthy that non-symmetrical NHC-ligands can also be prepared which enlarges the number of structural variation considerably.

Finally, Strassberger (Appl. Organometal. Chem. 2010, 24, 142-146) succeeded to synthesize substituted imidazolinium salts in multi-reactant one-pot routes using relatively cheap organic chemicals which are especially valuable for the possible substitution on the C-atoms at the 4 and 5 position, therefore the bulkiness of the NHC-ligands can further fine-tuned and through the introduction of various groups the electronical character of the NHC-ligand can be varied.

The processes referenced above may be rolled-out to a broad variety of NHC ligands.

Process for Preparing the Catalysts of General Formula (I)

Catalyst complexes according to general formula (I) can be prepared by simple ligand exchange reactions using a carbene ligand such as described in Fogg et al (Organometallics 2005, 24, 1056-1058) with an example reaction path shown below.

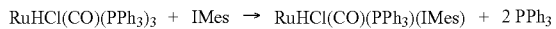

$RuHCl(CO)(PPh_3)_3 + IMes \rightarrow RuHCl(CO)(PPh_3)(IMes) + 2\,PPh_3$

A similar procedure can also be found in Nolan et al (Organometallics 2001, 20, 794). This reaction is possible as the NHC-type carbene is a relatively electron rich carbene with stronger bonding capability compared to many phosphine ligands.

Another option is the synthesis of a complex such as $RuHCl(CO)(NHC)(PPh_3)$ and a subsequent ligand exchange reaction with $PCy_3$ as described in Fogg et al. (Adv. Synth. Catal. 2008, 350, 773-777). This reaction allows to access various phosphine complexes provided the phosphine ligand to be introduced is stronger bonded to Ruthenium compared to $PPh_3$ for example.

Another synthetic approached includes the reaction of a Ruthenium complex which already carries a NHC-ligand with an akylidene ligand. Examples can be found in Mol et al., Eur. J. Inorg. Chem. 2003, 2827-2833 where a treatment with alcohol leads to the split-off of the benzylidene ligand and formation of a carbonyl-complex. However, this reaction path is only preferred if the introduction of a alkylidene ligand is fairly simple.

Most NHC-ligands are fairly stable and can therefore be isolated and introduced into the catalyst by the above mentioned ligand exchange reaction.

However, other typical precursors of the NHC-ligands are the respective salts such as imidazolium or imidazolinium salts for example. These salts can be deprotonated with strong bases generating the free carbenes as it is well known from the literature such as in Arduengo et al (J. Am. Chem. Soc., 1991, 113, 361-363) and following work from thereon. Although many carbenes of the NHC-type are surprisingly stable it may not always be practical to isolate them prior to the intended reaction with Ruthenium complexes. In that case the reaction mixture containing the carbene can directly be used in ligand exchange reactions if in prior trials a sufficiently high conversion of the NHC-salts to the carbene had been established.

Hydrogenation Enhancer (B):

The catalyst system according to this invention further comprises an additive (B) as hydrogenation enhancer.

The hydrogenation enhancer is selected from the group consisting of
- weak organic acids with a pKs (at 25° C.) of larger than 3, such as acetic acid, citric acid or ascorbic acid,
- earth alkaline metal salts such as $MgCl_2$ or $CaCl_2$,
- tetrafluoroboric acid diethyl ether ($HBF_4*OEt_2$) and
- trichloro(phenyl)silane.

Preferably, the hydrogenation enhancer is selected from the group consisting of $CaCl_2$, citric acid, ascorbic acid, tetrafluoroboric acid diethyl ether ($HBF_4*OEt_2$) and trichloro(phenyl)silane, or mixtures thereof.

More preferred hydrogenation enhancers are $CaCl_2$ and citric acid.

The amount of the hydrogenation enhancer (B) in the catalyst system depends on the nature and the catalytic activity of the catalyst. The amount of hydrogenation enhancer employed is typically chosen in the range of from 0.01 to 1.0 phr, preferable 0.04 to 0.6 phr and more preferably 0.044 to 0.556 phr based on the nitrile rubber used.

Process for Preparing the Catalyst System Comprising (A) and (B)

The components (A) and (B) can be mixed prior to be in contact with the nitrile rubber. It is also possible that either the component (A) or the component (B) is already in contact with the nitrile rubber prior to the hydrogenation reaction.

Process for Hydrogenating Nitrile Rubbers:

The hydrogenation of the nitrile rubber can be carried out by bringing the nitrile rubber into contact with the complex catalyst system in the presence of hydrogen.

The hydrogenation is preferably carried out at a temperature in the range of from 60° C. to 200° C., preferably from 80° C. to 180° C., most preferably from 100° C. to 160° C. and at a hydrogen pressure in the range of 0.5 MPa to 35 MPa, more preferably of 3.0 MPa to 10 MPa.

Preferably, the hydrogenation time of the nitrile rubber is from 10 minutes to 24 hours, preferably from 15 minutes to 20 hours, more preferably from 30 minutes to 8 hours, even more preferably from 1 hour to 4 hours and most preferably from 1 hour to 3 hours.

The amount of catalyst employed is typically chosen in the range of from 0.01 phr to 1.00 phr of catalyst preferably from 0.02 phr to 0.5 phr, in particular from 0.035 phr to 0.3 phr, based on the nitrile rubber used.

Firstly, a water-free solution of the nitrile rubber in a suitable water-free solvent is prepared. The concentration of the nitrile rubber in the hydrogenation reaction is not critical, but it should naturally be ensured that the reaction is not adversely affected by an excessively high viscosity of the reaction mixture and any associated mixing problem. The concentration of NBR in the reaction mixture is preferably in the range from 1 to 25% by weight, particularly preferably in the range from 5 to 20% by weight, based on the total reaction mixture.

The hydrogenation reaction is typically carried out in a suitable water-free solvent which does not deactivate the catalyst used and also does not adversely affect the reaction in any other way. Preferred solvents include but are not restricted to monochlorobenzene, dichloromethane, benzene, toluene, chlorophenol, methyl ethyl ketone, acetone, tetrahydrofuran, tetrahydropyran, dioxane and cyclohexane. The particularly preferred solvent is monochlorobenzene.

The amounts of water present should be kept low, to an extend that there is no deactivation of the catalyst, preferably less than 1 wt.-%. Let it be clearly stated at this point that the process of the invention is not a latex hydrogenation reaction.

Such solution of the nitrile rubber is then brought into contact with the catalyst system of this invention in the presence of hydrogen at the pressure mentioned above. The reaction mixture is typically stirred or any kind of shear mixing is introduced to allow sufficient contact of the solution with the hydrogen phase.

One major advantage of the present invention resides in the fact that the catalyst system used is very active, so that the residual catalyst in the final HNBR products is low enough to make the catalyst metal removal or recycle step alleviated or even unnecessary. However, to the extent desired, the catalysts used during the process of the present invention may be removed. Such removal can be performed e.g. by using ion-exchange resins as described in EP-A-2 072 532 A1 and EP-A-2 072 533 A1. The reaction mixture obtained after the completion of the hydrogenation reaction can be taken and treated with an ion-exchange resin at e.g. 100° C. for 48 hours under nitrogen which leads to a bonding of the catalyst to the resin while the reaction mixture can be worked up with the usual finishing methods.

The hydrogenated nitrile rubber can then be obtained from the solution by known workup procedures such as steam coagulation, solvent evaporation or precipitation and dried to a degree that allows usage in typical rubber processing methods.

For the purposes of the present invention, hydrogenation is a reaction of the double bonds present in the starting nitrile rubber to an extent of at least 50%, preferably 70-100%, more preferably 80-100%, even more preferably 90-100% and most preferably 95-100%. A fully hydrogenated nitrile rubber has an amount of residual double bonds of 1% or less.

After completion of the hydrogenation according to the present invention a hydrogenated nitrile rubber having a Mooney viscosity (ML1+4 at 100° C.), measured in accordance with ASTM standard D 1646, in the range from 1 to 130, preferably from 10 to 100, is obtained.

This corresponds to a weight average molecular weight Mw in the range 2,000-400,000 g/mol, preferably in the range 20,000-200,000 g/mol.

The hydrogenated nitrile rubbers obtained also have a polydispersity PDI=Mw/Mn, where Mw is the weight average molecular weight and Mn is the number average molecular weight, in the range of 1 to 5 and preferably in the range of 2.7 to 4.0.

A high gel content has negative influence on aging resistance. The gel content gets high, if the pH value is too low for example when HCl is generated, e.g. by dissociation from the Ru-complex or the MCB solvent.

Nitrile Rubber:

The nitrile rubber used in the process of the present invention is a copolymer or terpolymer of at least one α,β-unsaturated nitrile, at least one conjugated diene and, if desired, one or more further copolymerizable monomers.

The conjugated diene can be of any nature. Preference is given to using ($C_4$-$C_6$) conjugated dienes, more preferably selected from the group consisting of 1,3-butadiene, isoprene, 2,3-dimethylbutadiene, piperylene and mixtures thereof. Very particular preference is given to 1,3-butadiene and isoprene or mixtures thereof. Especial preference is given to 1,3-butadiene.

As α,β-unsaturated nitrile, it is possible to use any known α,β-unsaturated nitrile, preferably a ($C_3$-$C_5$) α,β-unsaturated nitrile, more preferably selected from the group consisting of acrylonitrile, methacrylonitrile, ethacrylonitrile and mixtures thereof. Particular preference is given to acrylonitrile.

A particularly preferred nitrile rubber used in the process of this invention is thus a copolymer having repeating units derived from acrylonitrile and 1,3-butadiene.

Apart from the conjugated diene and the α,β-unsaturated nitrile, the hydrogenated nitrile rubber may comprise repeating units of one or more further copolymerizable monomers known in the art, e.g. α,β-unsaturated (preferably mono-unsaturated) monocarboxylic acids, their esters and amides, α,β-unsaturated (preferably mono-unsaturated) dicarboxylic acids, their mono- or diesters, as well as the respective anhydrides or amides of said α,β-unsaturated dicarboxylic acids.

As α,β-unsaturated monocarboxylic acids acrylic acid and methacrylic acid are preferably used.

Esters of α,β-unsaturated monocarboxylic acids may also be used, in particular alkyl esters, alkoxyalkyl esters, aryl esters, cycloalkylesters, cyanoalkyl esters, hydroxyalkyl esters, and fluoroalkyl esters.

As alkyl esters $C_1$-$C_{18}$ alkyl esters of the α,β-unsaturated monocarboxylic acids are preferably used, more preferably $C_1$-$C_{18}$ alkyl esters of acrylic acid or methacrylic acid, such as methylacrylate, ethylacrylate, propylacrylate, n-butylacrylate, tert.-butylacrylate, 2-ethyl-hexylacrylate, n-dodecylacrylate, methylmethacrylate, ethylmethacrylate, propylmethacrylate, n-butylmethacrylate, tert.-butylmethacrylate and 2-ethylhexyl-methacrylate.

As alkoxyalkyl esters $C_2$-$C_{18}$ alkoxyalkyl esters of α,β-unsaturated monocarboxylic acids are preferably used, more preferably alkoxyalkylester of acrylic acid or methacrylic acid such as methoxy methyl(meth)acrylate, methoxy ethyl (meth)acrylate, ethoxyethyl(meth)acrylate and methoxyethyl(meth)acrylate.

It is also possible to use aryl esters, preferably $C_6$-$C_{14}$-aryl-, more preferably $C_6$-$C_{10}$-aryl esters and most preferably the aforementioned aryl esters of acrylates and methacrylates.

In another embodiment cycloalkyl esters, preferably $C_5$-$C_{12}$-, more preferably $C_6$-$C_{12}$-cyclo-alkyl and most preferably the aforementioned cycloalkyl acrylates and methacrylates are used.

It is also possible to use cyanoalkyl esters, in particular cyanoalkyl acrylates or cyanoalkyl methacrylates, with 2 to 12 C atoms in the cyanoalkyl group, preferably α-cyanoethyl acrylate, β-cyanoethyl acrylate or cyanobutyl methacrylate.

In another embodiment hydroxyalkyl esters are used, in particular hydroxyalkyl acrylates and hydroxyalkyl methacrylates with 1 to 12 C-atoms in the hydroxylalkyl group, preferably 2-hydroxyethyl acrylate, 2-hydroxyethyl methacrylate or 3-hydroxypropyl acrylate.

It is also possible to use fluorobenzyl esters, in particular fluorobenzyl acrylates or fluorobenzyl methacrylates, preferably trifluoroethyl acrylate and tetrafluoropropyl methacrylate. Substituted amino group containing acrylates and methacrylates may also be used like dimethylaminomethyl acrylate and diethylaminoethylacrylate.

Various other esters of the α,β-unsaturated carboxylic acids may also be used, like e.g. poly-ethyleneglycol(meth) acrylate, polypropyleneglycole(meth)acrylate, glycidyl (meth)acrylate, epoxy(meth)acrylate, N-(2-hydroxyethyl) acrylamide, N-(2-hydroxymethyl)acrylamide or urethane (meth)acrylate.

It is also possible to use mixture of all aforementioned esters of α,β-unsaturated carboxylic acids.

Furtheron α,β-unsaturated dicarboxylic acids may be used, preferably maleic acid, fumaric acid, crotonic acid, itaconic acid, citraconic acid and mesaconic acid. In another embodiment anhydrides of α,β-unsaturated dicarboxylic acids are used, preferably maleic anhydride, itaconic anhydride, itaconic anhydride, citraconic anhydride and mesaconic anhydride.

In a further embodiment mono- or diesters of α,β-unsaturated dicarboxylic acids can be used. Suitable alkyl esters are e.g. $C_1$-$C_{10}$-alkyl, preferably ethyl-, n-propyl-, iso-propyl, n-butyl-, tert.-butyl, n-pentyl- or n-hexyl mono- or diesters. Suitable alkoxyalkyl esters are e.g. $C_2$-$C_{12}$ alkoxyalkyl-, preferably $C_3$-$C_8$-alkoxyalkyl mono- or diesters. Suitable hydroxyalkyl esters are e.g. $C_1$-$C_{12}$ hydroxyalkyl-, preferably $C_2$-$C_8$-hydroxyalkyl mono- or diesters. Suitable cycloalkyl esters are e.g. $C_5$-$C_{12}$-cycloalkyl-, preferably $C_6$-$C_{12}$-cycloalkyl mono- or diesters. Suitable alkylcycloalkyl esters are e.g. $C_6$-$C_{12}$-alkylcycloalkyl-, preferably $C_7$-$C_{10}$-alkylcycloalkyl mono- or diesters. Suitable aryl esters are e.g. $C_6$-$C_{14}$-aryl, preferably $C_6$-$C_{10}$-aryl mono- or diesters.

Explicit examples of the α,β-ethylenically unsaturated dicarboxylic acid monoester monomers include
- maleic acid monoalkyl esters, preferably monomethyl maleate, monoethyl maleate, monopropyl maleate, and mono n-butyl maleate;
- maleic acid monocycloalkyl esters, preferably monocyclopentyl maleate, monocyclohexyl maleate, and monocycloheptyl maleate;
- maleic acid monoalkylcycloalkyl esters, preferably monomethylcyclopentyl maleate, and monoethylcyclohexyl maleate;
- maleic acid monoaryl ester, preferably monophenyl maleate;
- maleic acid mono benzyl ester, preferably monobenzyl maleate;
- fumaric acid monoalkyl esters, preferably monomethyl fumarate, monoethyl fumarate, monopropyl fumarate, and mono n-butyl fumarate;
- fumaric acid monocycloalkyl esters, preferably monocyclopentyl fumarate, monocyclohexyl fumarate, and monocycloheptyl fumarate;
- fumaric acid monoalkylcycloalkyl esters, preferably monomethylcyclopentyl fumarate, and monoethylcyclohexyl fumarate;
- fumaric acid monoaryl ester, preferably monophenyl fumarate;
- fumaric acid mono benzyl ester, preferably monobenzyl fumarate;
- citraconic acid monoalkyl esters, preferably monomethyl citraconate, monoethyl citraconate, monopropyl citraconate, and mono n-butyl citraconate;
- citraconic acid monocycloalkyl esters, preferably monocyclopentyl citraconate, monocyclohexyl citraconate, and monocycloheptyl citraconate;
- citraconic acid monoalkylcycloalkyl esters, preferably monomethylcyclopentyl citraconate, and monoethylcyclohexyl citraconate;
- citraconic acid mono aryl ester, preferably monophenyl citraconate;
- citraconic acid mono benzyl ester, preferably monobenzyl citraconate;
- itaconic acid mono alkyl esters, preferably monomethyl itaconate, monoethyl itaconate, monopropyl itaconate, and mono n-butyl itaconate;
- itaconic acid monocycloalkyl esters, preferably monocyclopentyl itaconate, monocyclohexyl itaconate, and monocycloheptyl itaconate;
- itaconic acid monoalkylcycloalkyl esters, preferably monomethylcyclopentyl itaconate, and monoethylcyclohexyl itaconate;
- itaconic acid mono aryl ester, preferably monophenyl itaconate;
- itaconic acid mono benzyl ester, preferably monobenzyl itaconate.

As α,β-ethylenically unsaturated dicarboxylic acid diester monomers the analogous diesters based on the above explicitly mentioned monoester monomers may be used, wherein, however, the two organic groups linked to the C═O group via the oxygen atom may be identical or different.

As further termonomers PEG acrylate monomers derived from PEG acrylates of the general formula (I)

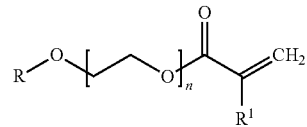

Formula (I)

where R is hydrogen or branched or unbranched $C_1$-$C_{20}$-alkyl, preferably methyl, ethyl, butyl or ethylhexyl, n is 1 to 8, preferably 2 to 8, more preferably 2 to 5 and most preferably 3 and $R^1$ is hydrogen or $CH_3$— may be used.

The term "(meth)acrylate" in the context of this invention represents "acrylate" and "methacrylate". When the $R^1$ radical in the general formula (I) is $CH_3$—, the molecule is a methacrylate. The term "polyethylene glycol" or the abbreviation "PEG" represents both monoethylene glycol sections having one repeat ethylene glycol unit (PEG-1; n=1) and polyethylene glycol sections having 2 to 8 repeat ethylene glycol units (PEG-2 to PEG-8; n=2 to 8). The term "PEG acrylate" is also abbreviated to PEG-X-(M)A where "X" represents the number of repeat ethylene glycol units, "MA" represents methacrylate and "A" represents acrylate. Acrylate monomers derived from PEG acrylates of the general formula (I) are referred to as "PEG acrylate monomers".

Preferred PEG acrylate monomers are selected from the following formulae no. 1 to no. 10, where n is 1, 2, 3, 4, 5, 6, 7 or 8, preferably 2, 3, 4, 5, 6, 7 or 8, more preferably 3, 4, 5, 6, 7 or 8 and most preferably 3:

Polyethylene glycol acrylate
(Formula no. 1)

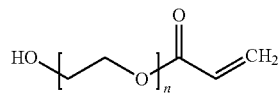

| | |
|---|---|
| Polyethylene glycol methacrylate (Formula no. 2) | 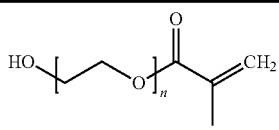 |
| Methoxy polyethylene glycol acrylate (Formula no. 3) | 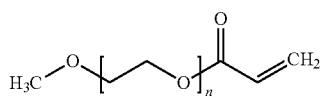 |
| Methoxy polyethylene glycol methacrylate (Formula no. 4) | 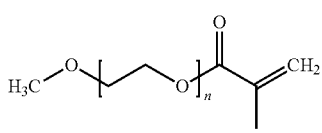 |
| Ethoxy polyethylene glycol acrylate (Formula no. 5) | 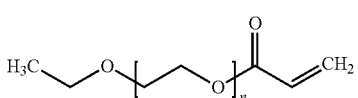 |
| Ethoxy polyethylene glycol methacrylate (Formula no. 6) | 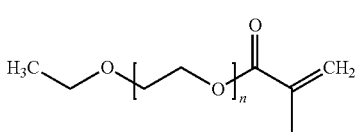 |
| Butoxy polyethylene glycol acrylate (Formula no. 7) | 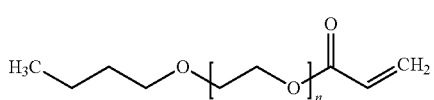 |
| Butoxy polyethylene glycol methacrylate (Formula no. 8) | 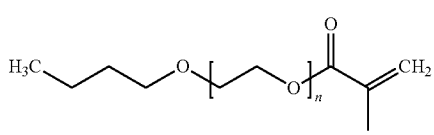 |
| Ethylhexoxy polyethylene glycol acrylate (Formula no. 9) | 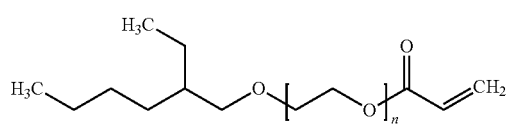 |
| Ethylhexoxy polyethylene glycol methacrylate (Formula no. 10) | 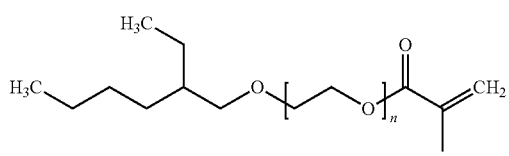 |

As further termonomers vinyl aromatic monomers like styrene, α-methylstyrene and vinylpyridine, as well as non-conjugated dienes like 4-cyanocyclohexene and 4-vinylcyclohexene, as well as alkynes like 1- or 2-butyne may be used. Particularly preferred are termonomers chosen from the below depicted formulae:

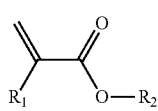 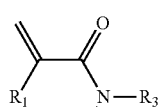

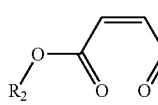 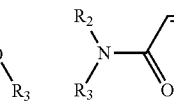

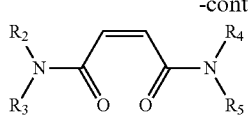

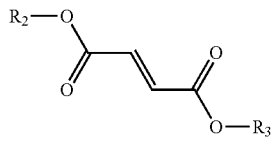

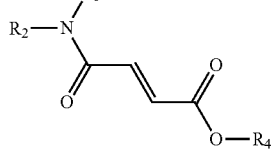

-continued

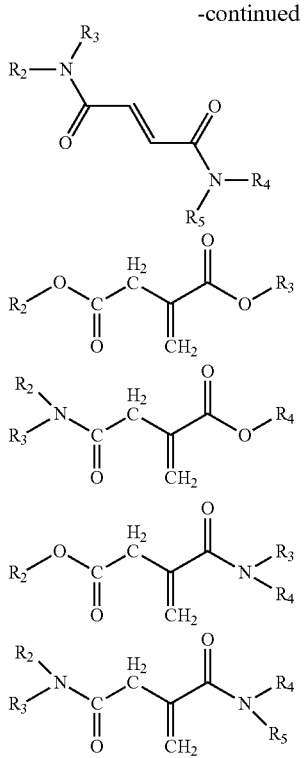

wherein
R¹ is hydrogen or a methyl group, and
R², R³, R⁴, R⁵ are identical or different and may represent H, $C_1$-$C_{12}$ alkyl, $C_3$-$C_5$ cycloalkyl, alkoxyalkyl, hydroxyalkyl, expoxyalkyl, aryl, or heteroaryl.

The proportions of conjugated diene and α,β-unsaturated nitrile in the NBR polymers to be used can vary within wide ranges. The proportion of the conjugated diene or the sum of conjugated dienes is usually in the range from 40 to 90% by weight, preferably in the range from 60 to 85% by weight, based on the total polymer. The proportion of α,β-unsaturated nitrile or the sum of α,β-unsaturated nitriles is usually from 10 to 60% by weight, preferably from 15 to 40% by weight, based on the total polymer. The proportions of the monomers in each case add up to 100% by weight. The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or the α,β-unsaturated nitrile or nitriles are replaced by proportions of the additional monomers, with the proportions of all monomers in each case adding up to 100% by weight.

The preparation of the nitrile rubbers by polymerization of the abovementioned monomers is adequately and comprehensively known from prior art. Nitrile rubbers which can be used for the purposes of the invention are also commercially available, e.g. as products from the product range of the Perbunan® and Krynac® grades of ARLANXEO Deutschland GmbH.

The term "acrylonitrile-butadiene rubber" or "nitrile rubber", also named as "NBR" for short, shall be interpreted broadly and refers to rubbers which are copolymers, terpolymers, quaterpolymers or the like of at least one α,β-unsaturated nitrile, at least one conjugated diene and, if desired, one or more further copolymerizable monomers.

Hydrogenated NBR, also referred to as "HNBR" for short, is produced commercially by hydrogenation of NBR. Accordingly, the selective hydrogenation of the carbon-carbon double bonds in the diene-based polymer must be conducted without affecting the nitrile groups and other functional groups (such as carboxyl groups when other copolymerizable monomers were introduced into the polymer chains) in the polymer chains.

The degree of hydrogenation of the copolymerized diene units in HNBR may vary in the range from 50 to 100% with the desired hydrogenation degree being from about 80 to 100%, preferably from about 90 to about 99.9%. Commercial grades of HNBR typically have a remaining level of unsaturation below 18% and a content of acrylonitrile of roughly up to about 50%.

It is possible to carry out the hydrogenation of NBR either with homogeneous or with heterogeneous hydrogenation catalysts. The catalysts used are usually based on rhodium, ruthenium or palladium, but it is also possible to use platinum, iridium, rhenium, osmium, cobalt or copper either as metal or preferably in the form of metal compounds (see e.g. U.S. Pat. No. 3,700,637, EP-A-0 134 023, DE-A-35 41 689, DE-A-35 40 918, EP-A-0 298 386, DE-A-35 29 252, DE-A-34 33 392, U.S. Pat. Nos. 4,464,515 and 4,503,196). Suitable catalysts and solvents for a hydrogenation in the homogeneous phase are also known from DE-A-25 39 132 and EP-A-0 471 250.

The present invention further relates to hydrogenated nitrile rubber, comprising
  100 ppm to 10,000 ppm, preferably 300 ppm to 5,000 ppm, more preferably 500 to 5,000 ppm and even more preferable 1,000 ppm to 4,000 ppm Calcium ions, measured by ICP-OES according to method as described in the examples section, and
  optionally 150 ppm or less and preferably 130 ppm or less and more preferably 1 to 50 ppm Ruthenium ions, measured by ICP-OES according to method as described in the examples section, and wherein
  the hydrogenated nitrile rubber has 2% or less residual double bonds (RDB), preferably 1% or less, and wherein
  the hydrogenated nitrile rubber has a gel content of less than 6%, preferably less than 4% and more preferable less than 3%, measured according to the method as described in the examples section.

Such an hydrogenated nitrile rubber is obtainable by the process of the invention as described above.

The present invention further relates to the use of a catalyst system comprising of the components
(A) at least one Ru-NHC-catalyst having the general formula (I)

$$Ru(CO)(H)(X^1)(L^1)(L^2) \qquad (I)$$

wherein
X¹ is an anionic ligand, and
L¹ and L² are identical or different ligands, wherein at least one of L¹ and L² represents a N-heterocyclic carbene ligand, and
(B) an hydrogenation enhancer selected from the group consisting of $CaCl_2$, citric acid, ascorbic acid, tetrafluoroboric acid diethyl ether ($HBF_4$*$OEt_2$) and trichloro(phenyl)silane or mixtures thereof as a catalyst system for partially or fully hydrogenating nitrile rubbers.

The invention is further illustrated but is not intended to be limited by the following examples in which all parts and percentages are by weight unless otherwise specified.

EXAMPLES

Abbreviations:

phr per hundred rubber (weight)

rpm revolution per minute

Mn number-average molecular weight

Mw weight-average molecular weight

PDI polydispersity index, defined as Mw/Mn $PPh_3$ triphenylphosphine

MCB monochlorobenzene

RT room temperature (22+/−2° C.)

RDB residue double bonds, in %, RDB=(1-hydrogenation degree)*100 with NBR having an RDB of 100%

NHC N-heterocyclic-carbene

Cy cyclohexyl ring $Et_3N$ triethylamine

IMes N,N'-bis(mesityl)imidazol-2-ylidene

A Preparation of Catalysts

A1 NHC-Ligands

N,N'-bis(mesityl)imidazol-2-ylidene (IMes) was purchased from TCI.

The following catalysts (a) and (b) were used; catalyst (b) was prepared similar to procedures found in the literature as outlined below:

(a) $RhCl(PPh_3)_3$ (used in comparative examples) (Wilkinson catalyst) obtained from Sigma-Aldrich and used without further purification.

(b) $RuHCl(CO)(IMes)(PCy_3)$ (used in inventive examples) The complex $RuHCl(CO)(PCy_3)_2$ was prepared following a procedure by James et al, Adv. in Chem. Ser., 196 (1983) as follows: $RuCl_3.xH_2O$ (0.635 g, 2.5 mmol) was dissolved in methoxyethanol (15 mL). After 5 min $PCy_3$ (2.056 g, 7.5 mmol) was added. The mixture was heated under reflux for 20 min. Then $Et_3N$ (2 mL) was added. The mixture was heated under reflux for another 6 hours and then cooled. The microcrystal orange product was filtered and then washed with toluene (2 times, each 10 mL) and dried in vacuum. The product was obtained as yellow crystals in 80% yield (1.45 g). The FT-IR on a saturated solution in MCB gave a single peak (CO) at 1901 $cm^{-1}$ and was thus considered to be free from the possible by-product $RuHCl(CO)_2(PCy_3)_2$. $RuHCl(CO)(PCy_3)_2$ was reacted with IMes following the procedure in Nolan et al (Organometallics 2001, 20, 794) as follows: A 100 mL flask was charged with $RuHCl(CO)(PCy_3)_2$ (510 mg, 0.7 mmol) and IMes (302 mg, 1.05 mmol), and degassed. Then 20 mL toluene were added via a syringe. Then the solution was heated to 80° C. for 2 hours and afterwards stirred for 18 hours at room temperature. The solvent was removed under vacuum. The orange-yellow residue was dispersed in 20 mL ethanol (degassed and dried) and the suspension was filtered. The precipitate was washed with ethanol (20 mL, 3 times) and dried under vacuum. The product was obtained (125.7 mg) as orange crystals with a single peak (CO) at 1897 $cm^{-1}$ (lit. 1896 $cm^{-1}$ in $CH_2Cl_2$).

B Nitrile Butadiene Rubbers

The nitrile butadiene rubbers used in the examples are obtainable by emulsion polymerization by known methods and have the properties as outlined in Table 1.

TABLE 1

| Nitrile Butadiene Rubbers (NBR) used | | | | | |
|---|---|---|---|---|---|
| | Acrylonitrile content, [% by weight] | Mooney viscosity ML(1 + 4)@ 100° C. | Mn [g/mol] | Mw [g/mol] | PDI |
| NBR 1 | 35 | 28.8 | 76612 | 257771 | 3.36 |
| NBR 2 | 34 | 33.4 | 68.949 | 243.404 | 3.53 |

C Hydrogenation of Nitrile Rubber

Catalysts (a) and (b) were used in amounts in the range of from 0.03 phr to 0.065 phr and the hydrogenation enhancer (B) was used in the range or from 0.01 phr to 1.0 phr as shown in the subsequent Tables under Section E.

The conditions for hydrogenation were:

8.3 MPa (1200 psi) hydrogen pressure 800 rpm of agitation

Temperature: variable, ranging from 120° C. to 155° C. as shown in the subsequent tables.

Time: variable depending on the progress of hydrogenation as shown in the subsequent tables.

Hydrogenation Procedure:

(1) The nitrile rubber was dissolved in a certain amount of MCB to form NBR solution (13 wt % concentration). The solution was filled in autoclave (600 mL volume or 2 L volume) and bubbled with nitrogen gas for 20 minutes to remove dissolved oxygen.

(2) Under nitrogen protection, catalyst was dissolved in a sufficient amount of degassed MCB. Under nitrogen protection the solution was transferred into a stainless bomb connected with a valve to the autoclave via syringe.

(3) After the autoclave was heated to desired temperature, the catalyst solution including the hydrogenation enhancer (B) was shot into the autoclave by applying hydrogen pressure. Then the hydrogen pressure was raised to desired value.

(4) Samples were taken out at intervals for FT-IR test to monitor the RDB.

(5) After the finish of NBR hydrogenation, the solution was cooled down and the pressure was released.

D Analysis and Tests

Measurement of the Hydrogenation Degree by FT-IR:

The spectrum of nitrile rubber before, during and after the hydrogenation reaction was recorded on a Perkin Elmer spectrum 100 FT-IR spectrometer. The solution of the (hydrogenated) nitrile butadiene rubber in MCB was cast onto a KBr pellet and dried to form a film for the test. The hydrogenation degree was determined by the FT-IR analysis according to the ASTM D 5670-95 method.

Measurement of the Gel Content:

The gel content of the polymer is determined as percentage of insolubles in methyl ethyl ketone. 0.1 to 0.2 g of the polymer sample is weighed into a volumetric flask, left for 18 h at room temperature and then shaken for two hours. The resulting mixture is transferred into a centrifuge tube and centrifuged at 25,000 rpm. Liquid parts are decanted and the moist residue is weighed. The residue is than dried at 60° C. until constant weight. The amount of gel is the difference between the total mass of the dried residue and polymer dissolved in the moisture over the residue from centrifugation. The gel content is the relation between amount of gel and mass of polymer sample and is given in weight percent.

Measurement of Ru-Content in Dried HNBR after Hydrogenation by ICP-OES

The ruthenium content of HNBR was determined on 0.5 g HNBR which was reduced to ashes at 550° C. in a platinum jar. The residue was dissolved in hydrochloric acid and diluted with deionized water. The ruthenium content was determined by ICP-OES (inductively coupled plasma optical emission spectrometry) at the following wavelengths 240.272 nm and 267.876 nm which are characteristic for ruthenium. The calibration was performed on acidic solutions of the respective metals at the same wavelength. For the selection of the characteristic wavelengths interferences with the sample matrix are avoided. Prior to the determination of the metal contents appropriate adjustments to the peak maxima were performed. Also adjustments in the concentration of the metal solutions were performed in order to perform the determinations in the linear region of the calibration curve.

E Results

TABLE E.1

Comparative Examples (catalyst (a) and (b) without hydrogenation enhancer)

| No. | NBR solution NBR | Catalyst solution Catalyst | Time | Hydrogenation degree |
|---|---|---|---|---|
| CEx. 1 | 518 g NBR 2; 3980 g MCB | 0.065 phr cat.(a); 1.0 phr TPP 0 phr Ru remaining | 1 h 2 h 3 h 4 h | 94.0% 98.8% 99.3% 99.7% |
| CEx. 2 | 518 g NBR 2; 3980 g MCB | 0.03 phr cat.(b), 41 ppm Ru remaining | 1 h 2 h 3 h 4 h | 46.0% 90.8% 98.7% 99.5% |
| CEx. 3 | 518 g NBR 1; 4010 g MCB | 0.03 phr cat.(b), 39 ppm Ru remaining | 1 h 2 h 3 h 4 h | 73.2% 88.6% 94.5% 96.8% |

TABLE E.2

Inventive Examples with catalyst system comprising (A) Ru—NHC-catalyst (b) (RuHCl(CO)(IMes)(PCy$_3$)) and (B) CaCl$_2$

| No. | NBR solution NBR | Catalyst solution Catalyst system | Time | Hydrogenation degree |
|---|---|---|---|---|
| Ex. 1 | 518 g NBR 2; 3980 g MCB | 0.03 phr cat.(b), 0.044 phr CaCl$_2$ (444 ppm per rubber) 36 ppm Ru remaining | 1 h 2 h 3 h 4 h | 88.0% 96.6% 99.1% 99.5% |
| Ex. 2 | 518 g NBR 1; 3980 g MCB | 0.03 phr cat.(b), 0.044 phr CaCl$_2$ (444 ppm per rubber) | 1 h 2 h 3 h 4 h | 95.9% 98.6% 99.4% 99.6% |

Ex.1 comprising the Ru-catalyst (b) and the hydrogenation enhancer (B) has higher hydrogenation degrees than CEx.2. Ex.2 has higher hydrogenation degrees than CEx.3. Thus, a hydrogenation process employing a catalyst system according to the invention comprising CaCl$_2$ leads to higher hydrogenation degrees.

TABLE E.3

Inventive Examples with catalyst system comprising (A) Ru—NHC-catalyst (b) (RuHCl(CO)(IMes)(PCy$_3$)) and (B) citric acid

| No. | NBR solution NBR | Catalyst solution Catalyst system | Time | Hydrogenation degree |
|---|---|---|---|---|
| Ex. 3 | 518 g NBR 2; 3980 g MCB | 0.03 phr cat.(b), 0.556 phr citric acid 36 ppm Ru remaining | 1 h 2 h 3 h | 98.9% 99.5% 99.7% |
| Ex. 4 | 518 g NBR 1; 4010 g MCB | 0.03 phr cat.(b), 0.556 phr citric acid 36 ppm Ru remaining | 1 h 2 h | 99.0% 99.7% |
| CEx. 4 | 518 g NBR 2; 4030 g MCB | 0.065 phr cat.(a), 1.0 phr TPP, 0.556 phr citric acid | 1 h 2 h 3 h | 88.0% 95.2% 96.8% |
| CEx. 5 | 518 g NBR 2; 4030 g MCB | 0.075 phr cat.(a), 1.0 phr TPP, 0.556 phr citric acid | 1 h 2 h 3 h | 93.3% 97.9% 98.6% |

Ex.3 has higher hydrogenation degrees than CEx.2. Ex.4 has higher hydrogenation degrees than CEx.3.

TABLE E.4

Inventive Examples with catalyst system comprising (A) Ru—NHC-catalyst (b) (RuHCl(CO)(IMes)(PCy$_3$)) and (B) tetrafluoroboric acid diethyl ether (HBF$_4$*OEt$_2$) or ascorbic acid or trichloro(phenyl)silane

| No. | NBR solution NBR | Catalyst solution Catalyst system | Time | Hydrogenation degree |
|---|---|---|---|---|
| Ex. 5 | 518 g NBR 1; 214 g MCB | 0.03 phr cat.(b), 0.065 phr HBF$_4$*OEt$_2$ | 1 h 2 h | 99.5% 99.8% |
| Ex. 6 | 518 g NBR 1; 214 g MCB | 0.03 phr cat.(b), 0.070 phr ascorbic acid | 1 h 2 h 3 h | 96.6% 99.2% 99.6% |
| Ex. 7 | 518 g NBR 1; 214 g MCB | 0.03 phr cat.(b), 0.085 phr trichloro(phenyl)silane | 1 h 2 h | 99.4% 99.8% |

Ex.5 has higher hydrogenation degrees than CEx.3. Ex.6 has higher hydrogenation degrees than CEx.3. Ex.7 has higher hydrogenation degrees than CEx.3.

The above examples clearly show that the catalyst systems according to general formula (I) are much more active in the hydrogenation of nitrile rubber in the presence of hydrogenation enhancing additive (B), than the well-known Wilkinson catalyst Rh(PPh$_3$)$_3$Cl or the catalyst RuHCl(CO)(IMes)(PCy$_3$) alone without an hydrogenation enhancing additive (B). This leads to recognizably reduced costs for carrying out the hydrogenation process.

It is also shown that in view of the low amounts of the catalyst required a recovery process for the catalyst or the catalyst metal—although possible by solution scrubbing with resins—is in fact not necessary. Due to the long term lower costs for ruthenium compared to other possible metals for the hydrogenation of nitrile rubber such as palladium, rhodium and iridium and due to the simple synthetic preparation of the catalysts a clear cost advantage is achieved.

As for the nitrile rubber substrate no special requirements are needed in order to successfully perform the hydrogenation. This means that commercially available nitrile rubber grades prepared by using standard emulsifier systems such as fatty acid soaps, rosin soaps, sulfonate or sulfate emulsifiers and standard redox activations systems can be used. As there are no further special requirements for the manufacture of the NBR other than just ensuring a usability in standard NBR compounding operations a very broad range of commercially available NBR rubber can be easily converted into hydrogenated nitrile rubber allowing to provide a much broader choice grade as currently available.

Although all catalysts employed in the experimental section contain phosphine ligands it is not needed to add further amounts of phosphine for a successful hydrogenation of nitrile rubber unlike the Wilkinson catalyst which clearly needs added $PPh_3$.

The HNBR resulting from the hydrogenation in the presence of the catalyst system comprising (A) and (B), wherein (B) is $CaCl_2$, is characterized in that the residual amount of Ru is in the range of 150 ppm or less and preferably 130 ppm or less, measured by ICP-OES, and wherein the residual amount of Ca is in the range of 100 ppm to 10,000 ppm, preferably 300 ppm to 5,000 ppm, more preferably 500 to 5,000 ppm and even more preferable 1,000 ppm to 4,000 ppm.

The effect of these residual amounts of Ru and Ca in HNBR are shown in Table E.5.

Positive Effects of Residual Ruthenium an Calcium Ions

Therban® 3627 was dissolved in acetone and mixed with Ru compound and $CaCl_2$ solution in ethanol for two hours on a shaker. The solution was dried afterwards at 55° C. to receive to solid rubber. The rubber was aged for 4 days at 140° C. in an oven.

TABLE E.5

| $CaCl_2$ [ppm] | Ru after drying [ppm] | Gel content [%] | Mooney viscosity [MU] | Aging gel content [%] | Aging Mooney viscosity [MU] | Delta MV [MU] |
|---|---|---|---|---|---|---|
| 5.1 | 0 | 110 | 0.8 | 87 | 25.2 | 109 | 22 |
| 5.2 | 1,000 | 130 | 1.2 | 76 | 2.2 | 85 | 9 |
| 5.3 | 2,500 | 130 | 1.8 | 77 | 3.4 | 86 | 9 |
| 5.4 | 4,000 | 130 | 2.9 | 77 | 3.9 | 88 | 11 |

The results in table E.5 clearly show that residual amounts of Ru and Ca in the HNBR in the range of 1,000 ppm to 4,000 have a positive influence on the gel content and the Mooney increase, especially after 4 days aging at 140° C. A low gel content in the hydrogenated nitrile rubbers is preferred and increases the processability.

What is claimed is:

1. A process for preparing partially or fully hydrogenated nitrile rubbers comprising subjecting a nitrile rubber in solution to hydrogenation in the presence of at least one catalyst system comprising the components (A) a Ru-NHC-catalyst having the general formula (I)

$$Ru(CO)(H)(X^1)(L^1)(L^2) \quad (I)$$

wherein $X^1$ is an anionic ligand, and $L^1$ and $L^2$ are identical or different ligands, wherein at least one of $L^1$ and $L^2$ represents a N-heterocyclic carbene ligand, and (B) a hydrogenation enhancer selected from the group consisting of $CaCl_2$, citric acid, tetrafluoroboric acid diethyl ether ($HBF_4*OEt_2$), ascorbic acid and trichloro (phenyl)silane or mixtures thereof.

2. A process according to claim 1, wherein the amount of the hydrogenation enhancer (B) is from 0.01 to 1.0 phr based on the nitrile rubber used.

3. A process according to claim 1, wherein the amount of Ru-NHC-catalyst is in the range of from 0.01 phr to 1.00 phr of Ru catalyst based on the nitrile rubber used.

4. The process according to claim 1, wherein a catalyst having the general formula (I) is used in which either (i) $L^1$ represents a ligand selected from the group consisting of a phosphine, sulfonated phosphine, phosphate, phosphinite, phosphonite, arsine, stibine, ether, amine, amide, sulfonate, sulfoxide, carboxyl, nitrosyl, pyridine, thioether, nitrile and isocyanide, and $L^2$ represents a N-heterocyclic carbene ligand, or (ii) both ligands $L^1$ and $L^2$ represent an identical or different N-heterocyclic carbene ligand.

5. The process according to claim 1, wherein $L^1$ represents a phosphine having the general formula (IIf)

(IIf)

wherein $R^1$, $R^2$ and $R^3$ are identical or different and may represent $C_1$-$C_{20}$ alkyl, $C_3$-$C_8$-cycloalkyl, $C_1$-$C_{20}$ alkoxy, substituted or unsubstituted $C_6$-$C_{20}$ aryl, $C_6$-$C_{20}$ aryloxy, $C_2$-$C_{20}$ heteroaryl with at least one heteroatom, a $C_2$-$C_{20}$ heterocyclyl group with at least one heteroatom, or halogen.

6. The process according to claim 1, wherein $L^1$ is selected from the group consisting of $PPh_3$, $P(p\text{-}Tol)_3$, $P(o\text{-}Tol)_3$, $PPh(CH_3)_2$, $P(CF_3)_3$, $P(p\text{-}FC_6H_4)_3$, $P(p\text{-}CF_3C_6H_4)_3$, $P(C_6H_4$—$SO_3Na)_3$, $P(CH_2C_6H_4$—$SO_3Na)_3$, $P(isopropyl)_3$, $P(CHCH_3(CH_2CH_3))_3$, $P(cyclopentyl)_3$, $P(cyclohexyl)_3$, $P(neopentyl)_3$ or $P(neophenyl)_3$, wherein Ph means phenyl and Tol means tolyl.

7. The process according to claim 1, wherein the N-heterocyclic carbene ligand is a cyclic carbene type ring ligand with at least one nitrogen as hetero atom being present in the ring, and wherein such N-heterocyclic carbene ligand can be unsubstituted or substituted with one or more substituents.

8. The process according to claim 7, wherein the N-heterocyclic carbene ligand has a structure corresponding to the general formulae (IIa) to (IIe)

(IIa)

(IIb)

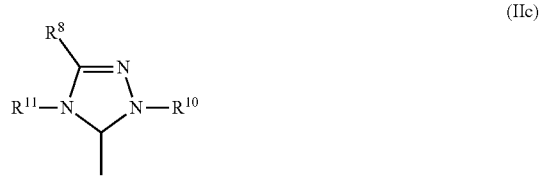

(IIc)

-continued

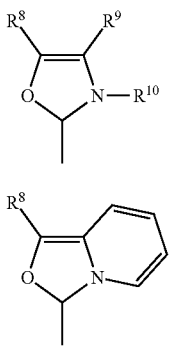
(IId)

(IIe)

wherein

R$^8$, R$^9$, R$^{10}$ and R$^{11}$ are identical or different and represent hydrogen, straight-chain or branched C$_1$-C$_{30}$-alkyl, C$_3$-C$_{20}$-cycloalkyl, C$_2$-C$_{20}$-alkenyl, C$_2$-C$_{20}$-alkynyl, C$_6$-C$_{24}$-aryl, C$_7$-C$_{25}$-alkaryl, C$_2$-C$_{20}$ heteroaryl, C$_2$-C$_{20}$ heterocyclyl, C$_1$-C$_{20}$-alkoxy, C$_2$-C$_{20}$-alkenyloxy, C$_2$-C$_{20}$-alkynyloxy, C$_6$-C$_{20}$-aryloxy, C$_2$-C$_{20}$-alkoxycarbonyl, C$_1$-C$_{20}$-alkylthio, C$_6$-C$_{20}$-arylthio, —Si(R)$_3$, —O—Si(R)$_3$, —O—C(=O)R, C(=O)R, —C(=O)N(R)$_2$, —NR—C(=O)—N(R)$_2$, —SO$_2$N(R)$_2$, —S(=O)R, —S(=O)$_2$R, —O—S(=O)$_2$R, halogen, nitro or cyano; wherein in each case R is identical or different and represents hydrogen, alkyl, cycloalkyl, alkenyl, alkynyl, aryl or heteroaryl and wherein one or more of R$^8$, R$^9$, R$^{10}$, and R$^{11}$ can independently of one another, be substituted by one or more substituents, which substituents, to the extent chemically possible, may in turn be substituted by one or more substituents.

9. The process according to claim 8, wherein the N-heterocyclic carbene ligand has a structure corresponding to the general formulae (IIa) to (IIe) wherein R$^8$ and R$^9$ are identical or different and represent hydrogen, C$_6$-C$_{24}$-aryl, straight-chain or branched C$_1$-C$_{10}$-alkyl, or form a cycloalkyl or aryl structure together with the carbon atoms to which they are bound, and R$^{10}$ and R$^{11}$ are identical or different and represent straight-chain or branched C$_1$-C$_{10}$-alkyl, C$_3$-C$_{10}$-cycloalkyl, substituted or unsubstituted C$_6$-C$_{24}$-aryl, C$_1$-C$_{10}$-alkylsulfonate, or C$_6$-C$_{10}$-arylsulfonate.

10. The process according to claim 8, wherein the N-heterocyclic carbene ligand has a structure corresponding to formulae (IIIa) to (IIIu), where "Ph" means in each case phenyl, "Bu" means either n-butyl, sec.-butyl, iso-butyl or tert.-butyl, "Mes" represents in each case 2,4,6-trimethylphenyl, "Dipp" means in all cases 2,6-diisopropylphenyl and "Dimp" means 2,6-dimethylphenyl,

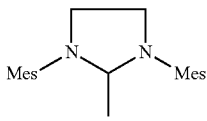
(IIIa)

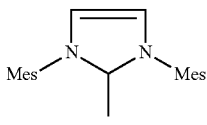
(IIIb)

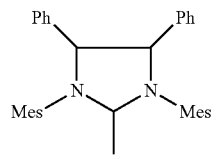
(IIIc)

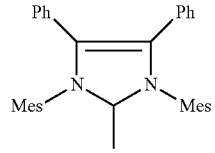
(IIId)

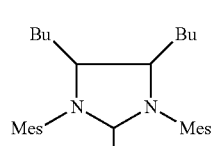
(IIIe)

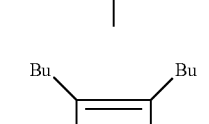
(IIIf)

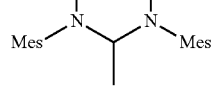
(IIIg)

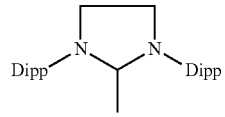
(IIIh)

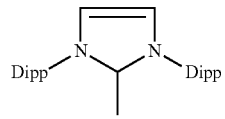
(IIIj)

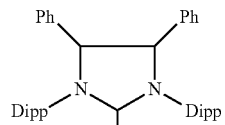
(IIIk)

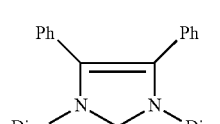
(IIIm)

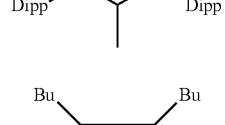
(IIIn)

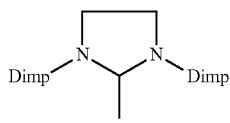
(IIIp)

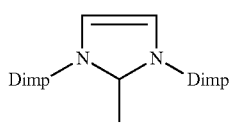
(IIIq)

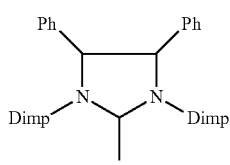
(IIIr)

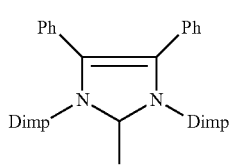
(IIIs)

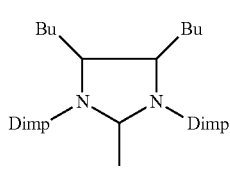
(IIIt)

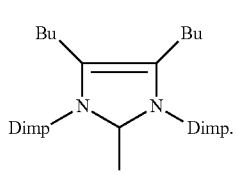
(IIIu)

11. The process according to claim 1, wherein $X^1$ represents hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$C_{20}$-alkylthiol, $C_6$-$C_{24}$-arylthiol, $C_1$-$C_{20}$-alkylsulfonyl or $C_1$-$C_{20}$-alkylsulfinyl and wherein all aforementioned moieties can be unsubstituted or also be substituted by one or more further substituents, and where these substituents may in turn also be substituted by one or more substituents selected from the group consisting of halogen, $C_1$-$C_5$-alkyl, $C_1$-$C_5$-alkoxy and phenyl.

12. The process according to claim 1, wherein a catalyst of formulae (Ia) to (I-d) is used

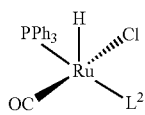
(I-a)

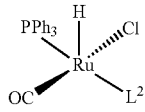
(I-b)

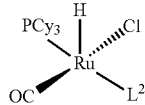
(I-c)

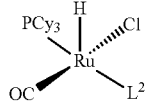
(I-d)

wherein $L^2$ represents a ligand of the general formulae (IIa) or (IIb)

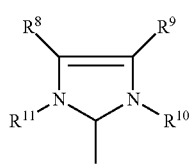
(IIa)

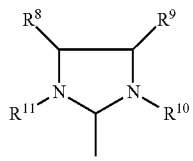
(IIb)

wherein $R^8$ and $R^9$ are identical or different and represent hydrogen, $C_6$-$C_{24}$-arylstraight-chain or branched $C_1$-$C_{10}$-alkyl, or form a cycloalkyl or aryl structure together with the carbon atoms to which they are bound, and $R^{10}$ and $R^{11}$ are identical or different and represent straight-chain or branched $C_1$-$C_{10}$-alkyl, $C_3$-$C_{10}$-cycloalkyl, substituted or unsubstituted $C_6$-$C_{24}$-aryl, $C_1$-$C_{10}$-alkylsulfonate, or $C_6$-$C_{10}$-arylsulfonate, or wherein $L^2$ represents a ligand of the general formulae (IIIa) to (IIIu) where "Ph" means in each case phenyl, "Bu" means in each case butyl, "Mes" represents in each case 2,4,6-trimethylphenyl, "Dipp" means in all cases 2,6-diisopropylphenyl and "Dimp" means in each case 2,6-dimethylphenyl,

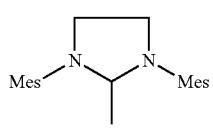
(IIIa)

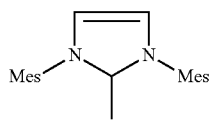
(IIIb)

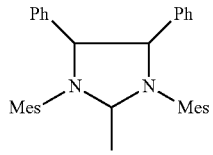
(IIIc)

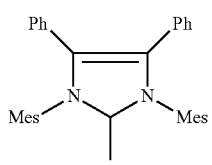
(IIId)
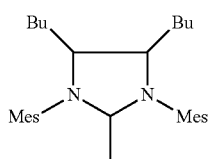
(IIIe)
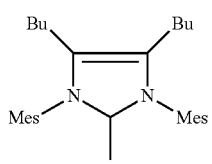
(IIIf)
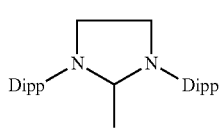
(IIIg)
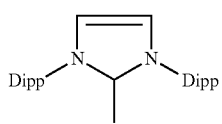
(IIIh)
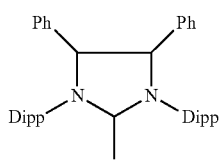
(IIIj)
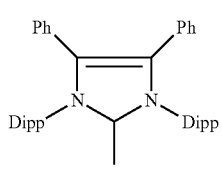
(IIIk)
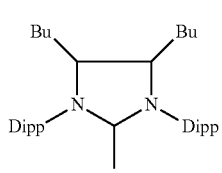
(IIIm)
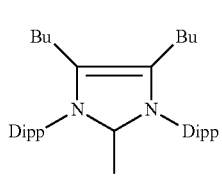
(IIIn)
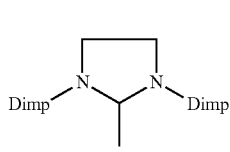
(IIIp)
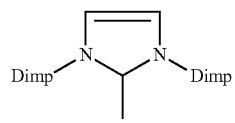
(IIIq)
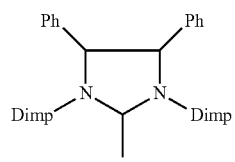
(IIIr)
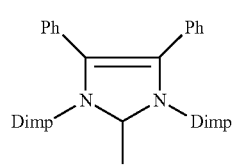
(IIIs)
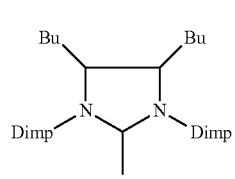
(IIIt)
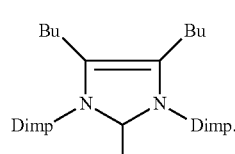
(IIIu)
13. A process according to claim 1, wherein a catalyst according to formulae (I-a(1)) to (I-d(1)) is used
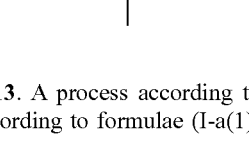
(I-a(1))
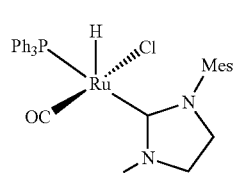
(I-b(1))
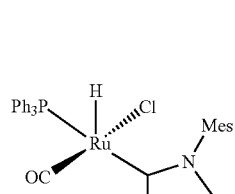
(I-c(1))

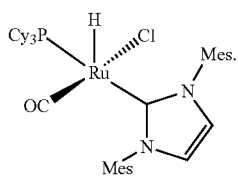
(I-d(1))

14. The process according to claim 1, wherein the hydrogenation is carried out at a temperature in the range of from 60° C. to 200° C. and at a hydrogen pressure in the range of 0.5 MPa to 35 MPa.

15. The process according to claim 1, wherein the nitrile rubber subjected to hydrogenation is a nitrile rubber comprising repeating units of
   (i) at least one α,β-unsaturated nitrile,
   (ii) at least one conjugated diene, and
   (iii) optionally one or more further copolymerizable monomers selected from the group consisting of α,β-unsaturated, mono-unsaturated, monocarboxylic acids, their esters and amides, α,β-unsaturated, mono-unsaturated, dicarboxylic acids, their mono- or diesters and the respective anhydrides or amides of said α,β-unsaturated dicarboxylic acids.

* * * * *